Oct. 13, 1931.                H. J. McKAY ET AL                1,826,945
                               MOLDING APPARATUS
                            Filed Feb. 6, 1928        3 Sheets-Sheet 2

Inventors
HOBART J. McKAY
PAUL J. CARLSEN
ALVIN O. FUHRMAN
EDWIN UNZEL

By Paul, Paul & Moore
ATTORNEYS

Oct. 13, 1931.  H. J. McKAY ET AL  1,826,945
MOLDING APPARATUS
Filed Feb. 6, 1928    3 Sheets-Sheet 3

Inventors
HOBART J. McKAY
PAUL J. CARLSEN
ALVIN O. FUHRMAN
EDWIN UNZEL
By Paul, Paul + Moore
ATTORNEYS Patented Oct. 13, 1931

1,826,945

UNITED STATES PATENT OFFICE

HOBART J. McKAY, PAUL J. CARLSEN, AND ALVIN O. FUHRMAN, OF ST. PAUL, AND EDWIN UNZEL, OF MINNEAPOLIS, MINNESOTA, ASSIGNORS TO AMERICAN CONTAINER CORPORATION, OF ST. PAUL, MINNESOTA, A CORPORATION OF DELAWARE

MOLDING APPARATUS

Application filed February 6, 1928. Serial No. 252,316.

This invention relates to new and useful improvements in molding apparatus adapted for making containers and other products molded from a plastic material, and more particularly relates to containers adapted for use in the manufacture of storage batteries, which usually are provided with a plurality of partitions for dividing the container into compartments, each adapted to receive a battery cell.

Containers such as are now commonly used for storage batteries, are usually molded from a plastic composition material. This material, when delivered to the mold, is comparatively hot so that it will be sufficiently plastic and soft to allow the plunger to force it into all cavities in the mold. As a result of the temperature of the material, when being molded, undesirable elements, such as gases, vapor, air, volatilized oil and wax, and other elements tend to develop within the mold. If these elements cannot escape from the interior of the mold, they obviously become entrapped therein, and consequently tend to prevent complete filling of the mold, often resulting in the walls and partitions of the container being imperfect or defective, particularly the upper edges thereof.

Apparatus now in general use for molding composition products, such, for example, a storage battery container, is not to our knowledge, provided with means for releasing undesirable elements that become entrapped within the mold, during the molding operation, and consequently the percentage of defects in the walls and partitions of the containers manufactured with such apparatus, is comparatively high. It is of the utmost importance in the manufacture of battery containers, that the walls and partitions thereof be absolutely free from defects, to avoid leakage of the acid from the container, and also to prevent leakage between adjacent cells.

To avoid the above difficulties, we have discovered that by embodying in the construction of the mold, suitable means for venting the interior thereof, during the molding operation, that the walls and partitions of the resultant container or product, will be substantially free from defects such as rough spots, "hair lines", etc.; and also the walls and partitions will be uniform, and the surfaces thereof will be hard and smooth.

It is the purpose of this invention to provide means operable in connection with an ordinary molding apparatus, to permit the escape of all entrapped gaseous and vaporous elements which may become entrapped in the mold during the molding operation. When such gases and vapors are permitted to escape from the mold, the walls of the container will be substantially free from defects. We have also found from actual experience, that by providing suitable means for venting the interior of the mold to permit the escape therefrom of gaseous elements, which may be present therein, that the density of the walls of the resultant container will be increased, thus also improving the dielectric strength thereof. The vent means may be located at any point in the mold where undesirable gaseous and vaporous elements are likely to accumulate or become entrapped as, for example, those portions of the mold forming the upper edges of the partitions, as these partitions are usually thinner than the walls of the container, resulting in the upper central portions thereof usually being the last to be formed during the molding operation. Gaseous and vaporous elements developing within the mold therefore usually accumulate in those portions of the mold forming the upper portions of the partitions. When these portions of the mold are properly vented to permit the escape of accumulated gases, the upper edges of the partitions, as well as the other walls thereof, will be free from defects, rough spots or marks, when the container is completed.

The particular object of the present invention, therefore, is to provide a suitable venting means operable in connection with a mold to permit the escape from the interior thereof, of gaseous and vaporous elements and other undesirable elements, which tend to develop therein during the molding operation, resulting in the production of a product which will be substantially free from defects.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the accompanying drawings forming part of this specification;

Figure 1:
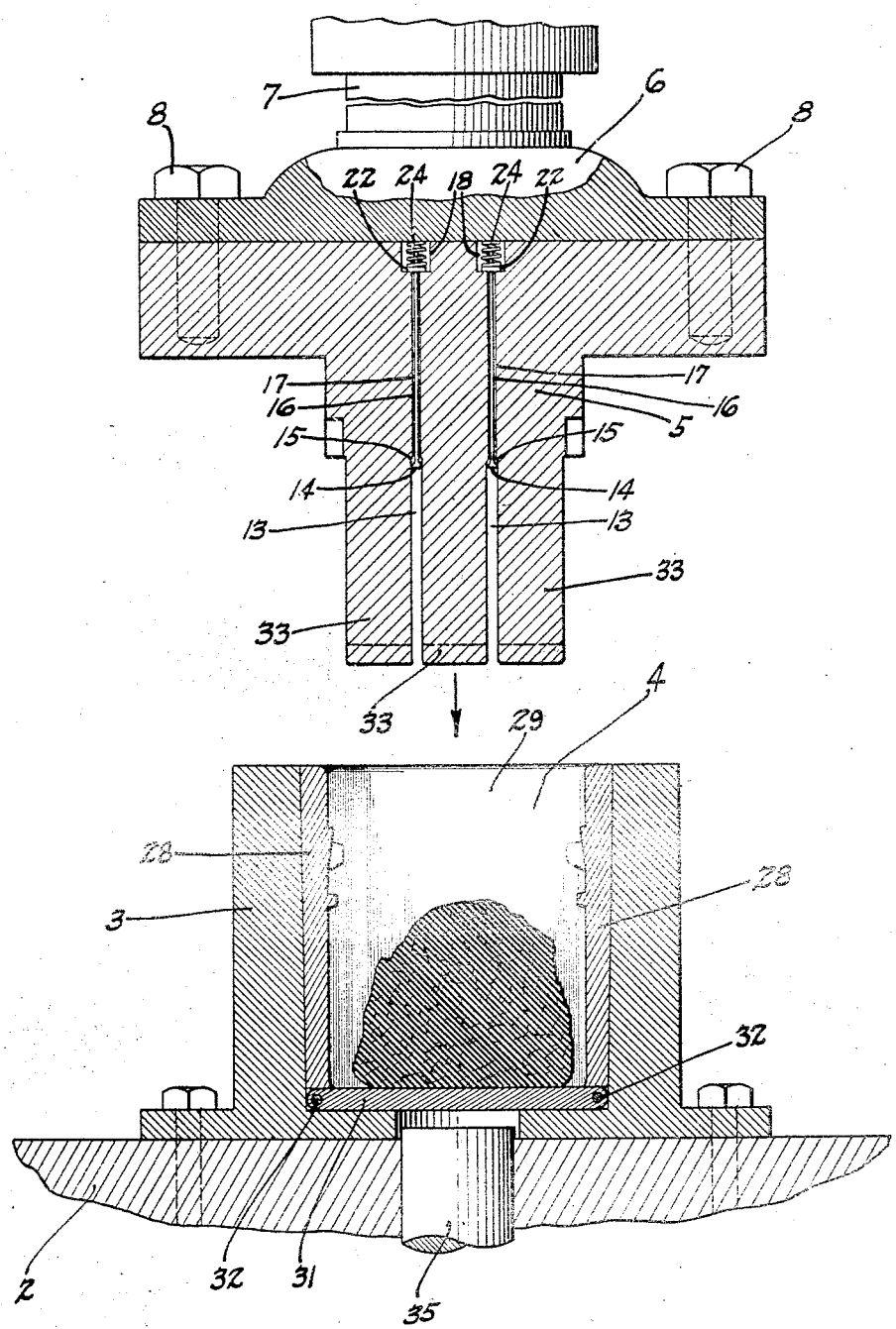
Figure 1 is a vertical sectional view showing a portion of a press with the male and female mold members in their inoperative positions, in this instance, the invention being shown embodied in the male member of the mold.

In the selected embodiment of the invention here shown, there is illustrated in Figure 1 of the accompanying drawings, a portion of an ordinary press comprising the usual supporting plate 2 upon which the female member 3 of the mold is secured. This member comprises four upright walls defining a cavity or chamber 4 adapted to receive the male member 5 of the mold. The male member 5 is here shown detachably secured to a head 6, terminally provided upon a ram 7, of ordinary construction. Bolts 8 secure the member 5 to the head 6.

Figure 6:
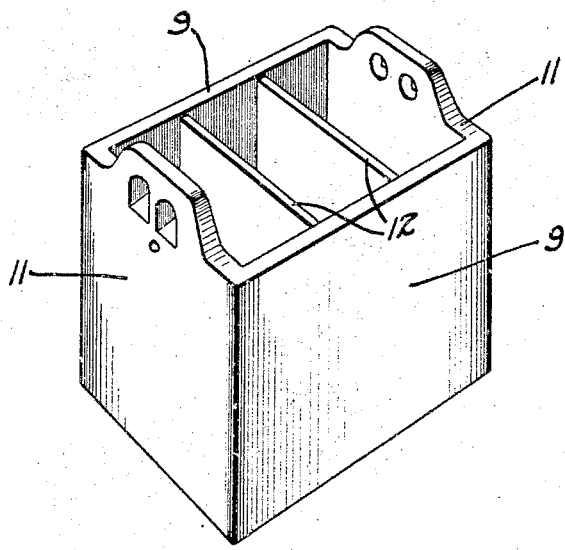
Figure 6 is a perspective view of a completed container.

The mold members 3 and 5 here shown are of a design adapted for making containers for storage batteries. Figure 6 illustrates such a container, comprising the side walls 9, end walls 11 and the partitions 12, which are integrally formed with the side walls 9 and divide the container into three compartments. As before stated, in order to form or mold a container in a manner that will insure that the upper portions of the partitions therein will be free from defects, we provide means for venting the upper portions of the slots 13, provided in the plunger or male member 5, so that the upper portions of the partitions 12 will be accurately formed and all defects and roughness will be substantially eliminated therefrom.

Figure 2:
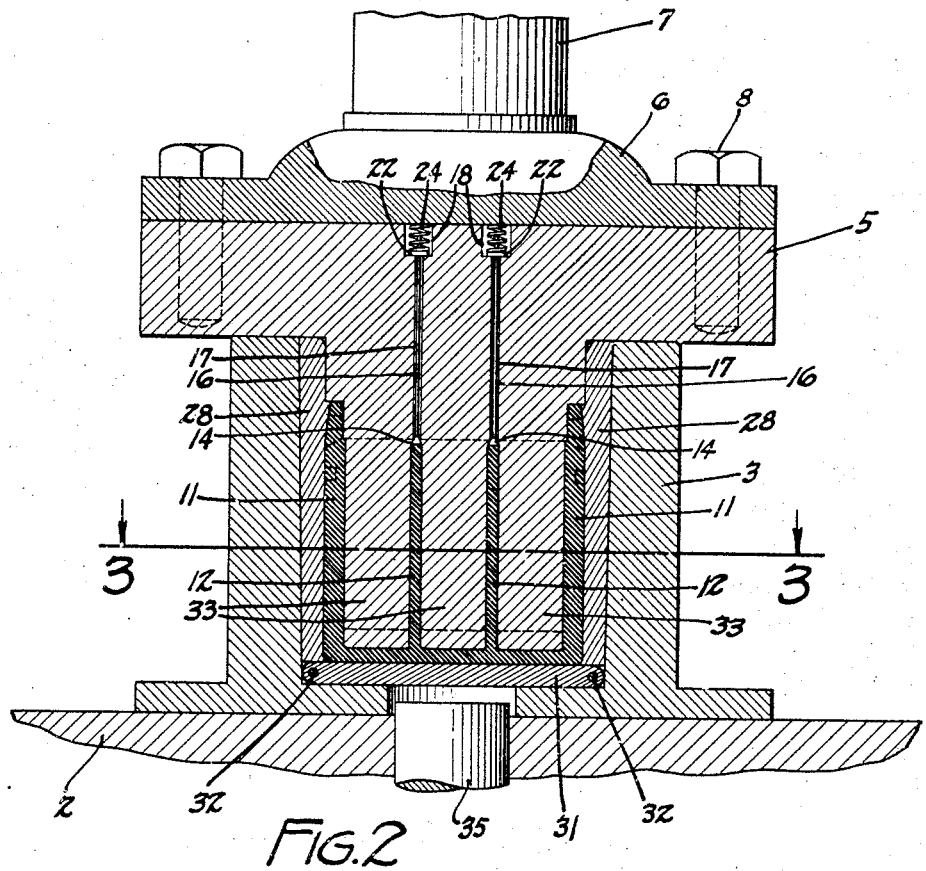
Figure 2 is a similar view showing the mold members in their operative or molding positions.
Figure 3:
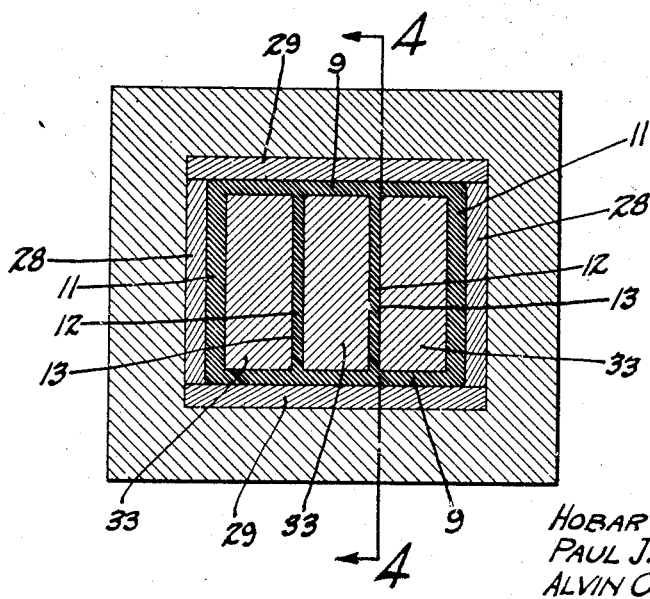
Figure 3 is a horizontal sectional view on the line 3—3 of Figure 2.

In the drawings, we have illustrated how this portion of the mold may be vented to permit the escape of undesirable gases and vapors which may become entrapped therein. (See Figure 4.) To illustrate the invention, we have shown a valve 14 mounted in the male member 5 of the mold, directly over each slot 13, as shown in Figures 1 and 2. As these valves are alike, only one will be described in detail. The valve 14 is seated upon a conical seat 15 and has a stem 16 traversing an orifice 17 provided in the body of the male member 5, the upper end of which terminates in a socket 18. The upper end 21 of the stem 16 is threaded to receive a collar 22, preferably having a seat 23 adapted to receive one end of a compression spring 24. The upper end of this spring is seated against the bottom face of the head 6. A duct 27 is also provided in the body of the member 5 and has one end communicating with the orifice 17 to permit the escape of gases therefrom, when the valve is in the position shown in Figure 4. The spring 24 constantly urges the stem 16 downwardly so that the valve 14 is normally spaced from the seat 15. In the drawings, we have shown the female member 3 of the mold lined with suitable facing plates 28 and 29, and also a bottom plate 31 to which the facing plates 28 may be pivotally connected, if desired, as indicated at 32 in Figures 1 and 4.

Figure 4:
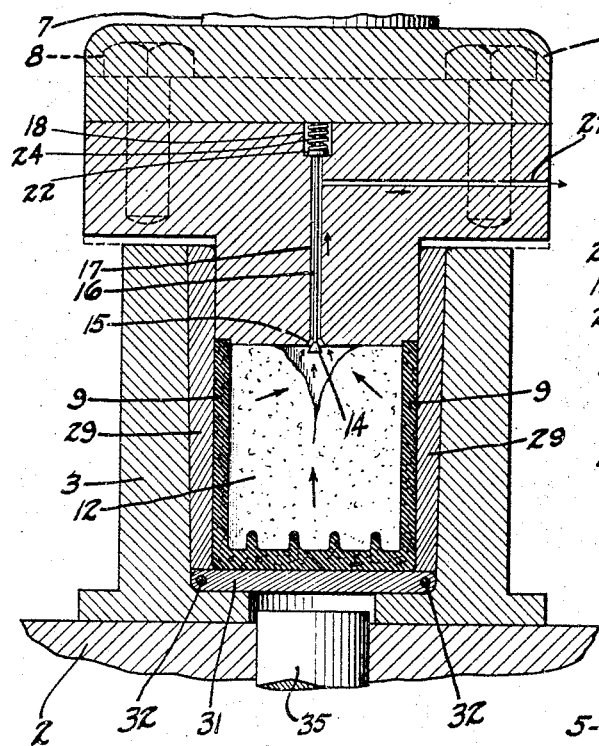
Figure 4 is a vertical sectional view on the line 4—4 of Figure 3, and the small arrows indicating the escape of the gaseous vapors entrapped within the mold.

In the operation of the mold, a predetermined quantity of the plastic material, from which the container is to be formed, is placed in the female member 3 of the mold, as shown in Figure 1. The plunger or male member 5 of the mold is then moved downwardly by the ram 7, whereby the depending extensions 33 of the male member 5 will engage the material and force it into all the cavities in the mold, because of its plasticity, as illustrated in Figures 2 and 4. As a result of the portions 12 of the container usually being comparatively thinner than the side and end walls thereof, the upper central portions of the slots 13, forming the upper portions of the partitions, are usually the last to fill with the material; the material being forced upwardly and inwardly as indicated by the larger arrows in Figure 4, as the plunger continues its downward movement to the position shown in Figure 2.

Figure 5:
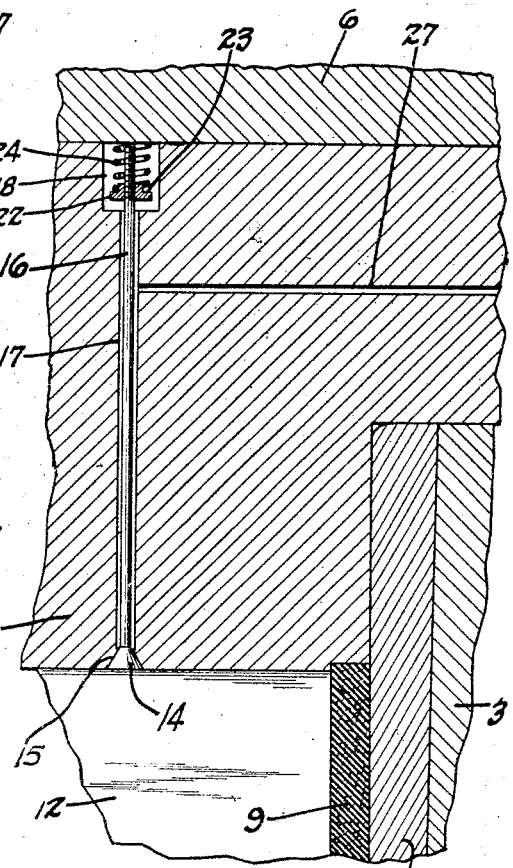
Figure 5 is an enlarged detailed view illustrating a form of valve for venting the interior of the mold.

Figure 4 illustrates the plunger just before reaching the limit of its downward movement. During the downward movement of the plunger the valves 14 will be retained in open position by the springs 24, thereby permitting all of the gaseous and vaporous elements, accumulating in the cavities 34, to escape through the orifices 17 and ducts 27 to the atmosphere, as indicated by the arrows. When the plunger reaches the limit of its downward movement, shown in Figure 2, the plastic material forced into the slots 13 of the plunger, will engage the valve heads 14 and force them upwardly into engagement with their respective seats, as clearly shown in Figure 5. By thus venting the mold, the upper edges or portions of the partitions 12 will be accurately formed, and the surfaces thereof will be hard and smooth, similar to the surfaces of the side and end walls 9 and 11, respectively. The plunger or male member 5 is then withdrawn from the mold in the usual manner, to a position above the female member 3, as shown in Figure 1.

In the form of mold here illustrated, we have shown a ram 35 arranged beneath the bottom facing plate 31 of the mold and positioned to engage the plate 31 to move the facing plates upwardly, to permit the removal of the container from the mold. This ram may be hydraulically operated or by other suitable power means available. It is to be understood, of course, that when the container is removed from the female member 3, by the upward movement of the facing plates 28, 29, and 31, as the result of their engagement with the plunger 35, that the plunger or male member 5 will be raised to a height above the member 3 sufficient to permit the container to be readily removed from the mold without interference with the member 5.

The important feature of this invention, therefore and as before stated, is to provide suitable means for venting the interior of a mold to permit the escape from the mold of gaseous vapors and other undesirable elements tending to accumulate therein, during the molding operation. By thus permitting such undesirable elements to escape to the atmosphere, all of the mold cavities will be completely filled with the material, resulting in the production of a product which will be uniformly and accurately formed, and will be substantially free from defects.

To illustrate the invention, we have shown in the drawings an ordinary type of spring-actuated conical valve, but it is to be understood that any other type of valve or mechanism which will vent the interior of a mold in the manner above described, may be used without departing from the scope of the invention. In the drawings, we have also shown the venting means as being located at the upper ends of the slots 13 in the plunger. It is to be understood, however, that the venting means may be located at any particular point in the plunger or mold where undesirable gases or vapors may tend to accumulate and become entrapped. In ordinary practice, the partitions 12 of the container are usually made thinner than the side and end walls thereof, which results in the upper portions of the partitions being the last to be filled or completed during the molding operation, as illustrated in Figure 4. However, should the side and end walls be reduced in thickness to that of the partitions, then it likely would be necessary to provide means for venting those portions of the mold forming the upper portions of such walls. We, therefore, do not wish to confine the location of the venting means or valves 14 to that shown in the accompanying drawings, as obviously the venting means may be located at any particular point in the mold where the undesirable elements tend to accumulate, the primary object of the invention being to relieve the interior of the mold of such elements.

By venting the mold as set forth in this application, we have found that the usual "hair lines" or molding lines, caused by an imperfect and retarded "knitting" action of the plastic material in the upper portions of the partitions, will be substantially eliminated, thus giving higher dielectric and mechanical strength. Porosity of the partitions caused by an occlusion of undesirable gaseous and vaporous elements is also eliminated, thus increasing the density of the walls and partitions and improving the dielectric strength, and also the chemical and physical properties of the containers, when completed. Incomplete filling of the upper portions of the walls and partitions cannot occur when the mold is vented, because the gaseous vapors and other elements accumulating in the mold, will escape through the orifices 17 and ducts 27, thereby resulting in the formation of complete and uniform walls and partitions, both in structure and appearance.

From the foregoing, therefore, it will readily be understood that when a mold of the character herein referred to, is provided with means for venting the interior of the mold in the manner here set forth, the undesirable gaseous and vaporous elements cannot collect in the molds as, for example, in the cavities 34, because they will be forced through the venting means to the atmosphere, by the pressure tending to build up in the cavities 34, as a result of the material flowing inwardly from all directions as indicated by the larger arrows in Figure 4. Expelling of such elements from the interior of the mold also prevents corrosion of the plunger, with the result that the surfaces thereof will be maintained smooth, resulting in production of a container, the walls of which will be uniform and accurate in thickness and density, and the surfaces of which will also be smooth and hard.

We claim as our invention:

1. The combination with an apparatus for molding storage battery containers, comprising a mold including a male member adapted to form the interior of the container, said member having a plurality of transverse slots therein adapted to form the partitions in the upper portions of the container, of valves in said member, each communicating with one of said slots and each adapted to permit the escape of vapor and foreign elements entrapped in said slots, during the pressure stroke of said member.

2. The combination with an apparatus for molding containers of a plastic material having one or more partitions therein, comprising a mold including a male member adapted to form the interior of the container, of a normally open spring-actuated valve in the upper portion of said member adapted to permit the escape from said mold of gaseous and vaporous elements tending to accumulate therein during the pressure stroke of said member.

3. The combination with an apparatus for molding containers of a plastic material, comprising a mold including a male member adapted to form the interior of the container, said member having a slot therein adapted to form a partition in the container, of a normally open spring-actuated valve in said member communicating with said slot and providing a discharge for gaseous and vaporous elements tending to accumulate in the upper portion of said slot, during the molding operation, said valve being adapted to be seated by pressure of the composition material thereagainst, when said male member approaches the limit of its molding stroke.

In witness whereof, we have hereunto set our hands this 3rd day of February 1928.

HOBART J. McKAY.
PAUL J. CARLSEN.
ALVIN O. FUHRMAN.
EDWIN UNZEL.